J. P. HARRISSON.
COTTON-CHOPPER.
No. 188,895. Patented March 27, 1877.
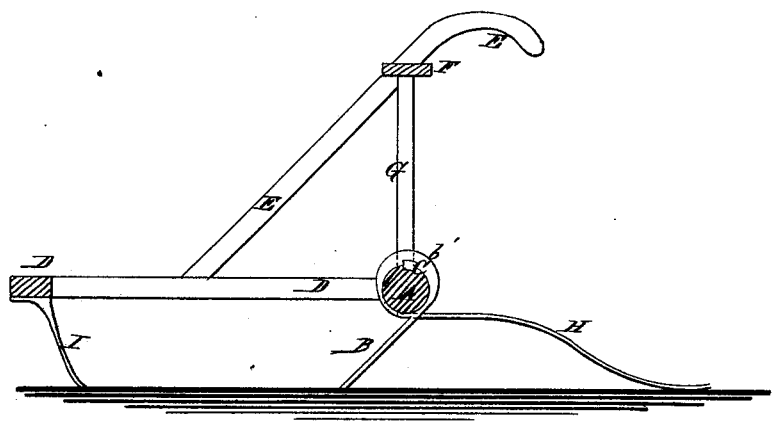
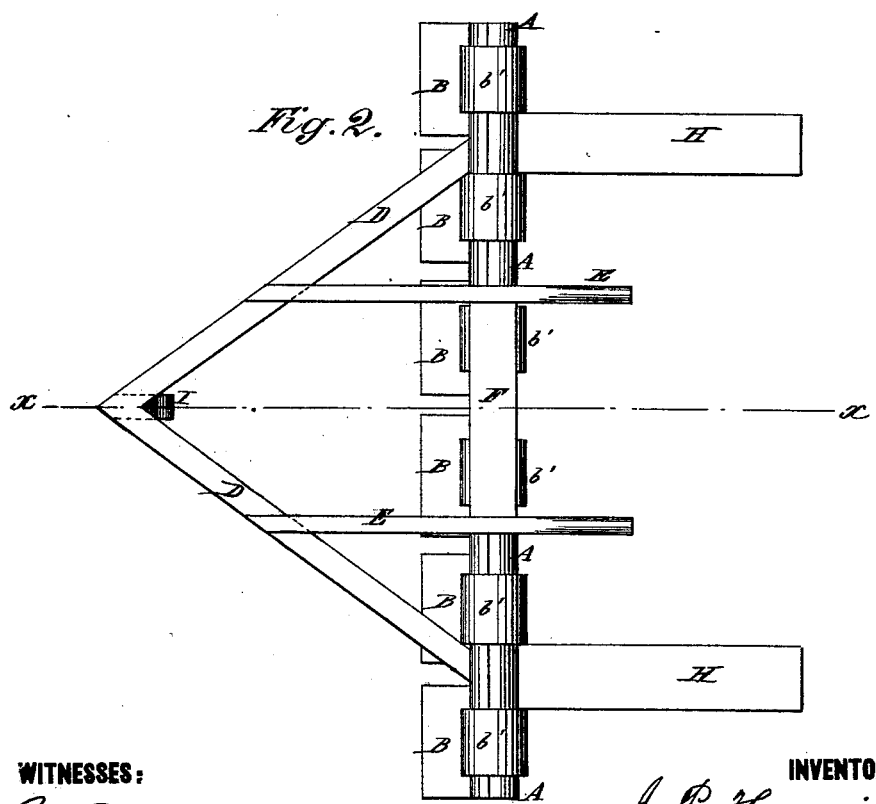
WITNESSES:
H. Rydquist
J. H. Scarborough
INVENTOR:
J. P. Harrisson
BY Munn
ATTORNEYS.

UNITED STATES PATENT OFFICE.

JOHN P. HARRISSON, OF ABERDEEN, MISSISSIPPI.

IMPROVEMENT IN COTTON-CHOPPERS.

Specification forming part of Letters Patent No. 188,895, dated March 27, 1877; application filed December 23, 1876.

*To all whom it may concern:*

Be it known that I, JOHN P. HARRISSON, of Aberdeen, in the county of Monroe and State of Mississippi, have invented a new and useful Improvement in Cotton-Chopper, of which the following is a specification:

Figure 1 is a vertical longitudinal section of my improved cotton-chopper, taken through the line $x$ $x$, Fig. 2. Fig. 2 is a top view of the same.

Similar letters of reference indicate corresponding parts.

The object of this invention is to furnish an improved cotton-chopper, which shall be so constructed as to chop the crop to a stand by being drawn across the field, and which shall be simple in manufacture, convenient in use, and reliable in operation.

The invention consists in the combination of the shaft, the hoes, the beams, and the springs with each other, as hereinafter fully described.

A is the shaft or cross-beam, which may be made round or square, and to which the hoes B are attached. The hoes B are made with eyes $b'$, to receive and fit upon the shaft A, where they are secured in place by keys C driven into grooves in the said shaft. This construction enables the hoes B to be adjusted wider apart or closer together, according to the number of stalks desired to be left for a stand. The hoes are made twelve inches, more or less, in width, according to the space required to be left between the hills. To the shaft A, toward its ends, are attached the ends of the two beams D, the forward ends of which meet at an angle, and are secured to each other. To the middle part of the beams D are attached the forward ends of the handles E, the rear parts of which are attached to the ends of the cross-bar F. The handles E are held at the desired elevation by the standards G, the upper ends of which are attached to the cross-bar F, and their lower ends are attached to the shaft A. To the end parts of the shaft A are attached the forward ends of two springs, H, which project to the rearward, and the rear parts of which are curved downward, rearward, and upward. The rear parts of the springs H rest and slide upon the ground, and are designed to support the hoes, and prevent them from dropping down when crossing the water-furrows. To the beams D, at their point of meeting, is attached a spring, I, which projects downward and rearward, and is designed to prevent the forward ends of the beams D from dropping or being thrown down when the hoes B strike the bed or furrow.

The ends of the shaft A may be kept from springing, when the hoes strike the ridge, by stay-rods, the rear ends of which are attached to the said ends, and their forward ends are secured to the beams D by the bolts that secure the lower ends of the handles to said beams.

Having thus described my invention, I claim as new and desire to secure by Letters Patent—

The combination of the shaft A, the hoes B, the beams D, and the springs H and I with each other, substantially as herein shown and described.

JOHN PRATOR HARRISSON.

Witnesses:
JACOB GATTMANN,
JAMES CARLISLE.